Sept. 10, 1929.  C. H. STERLING  1,727,794
OVERGEAR TRANSMISSION
Filed Jan. 15, 1927
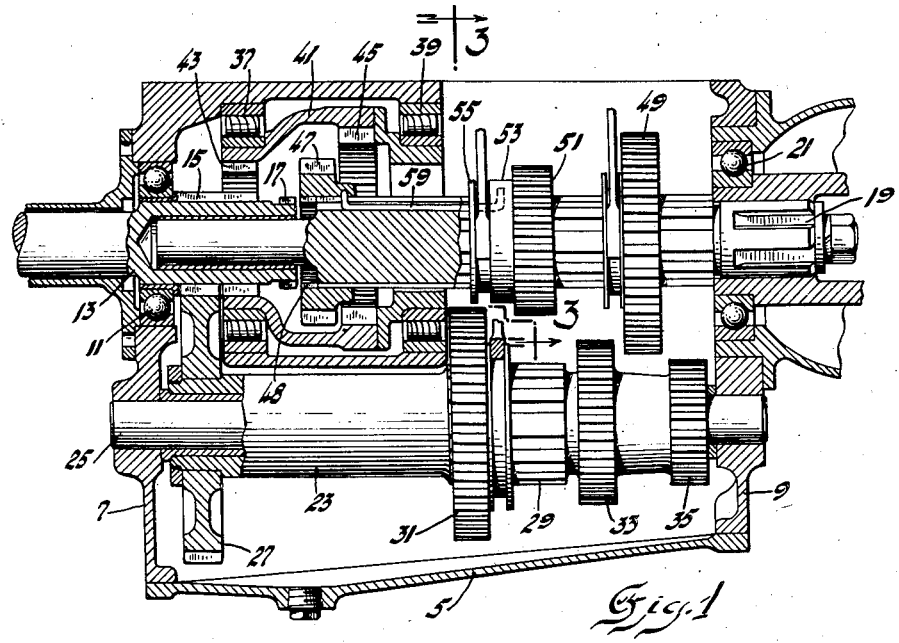
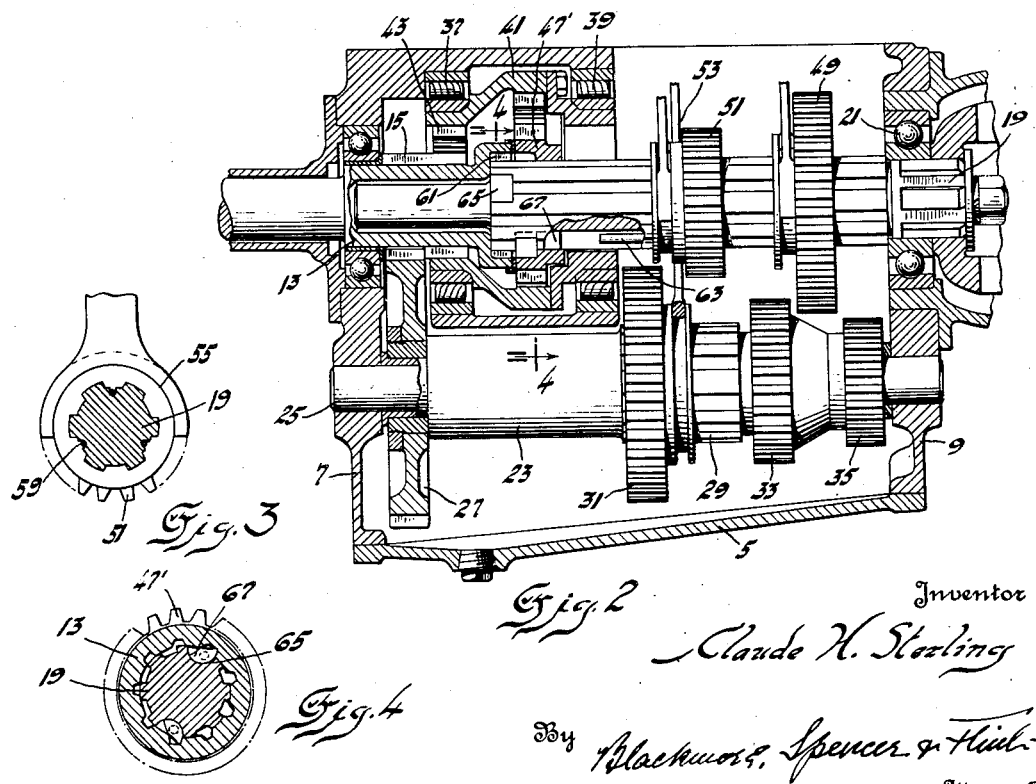
Fig. 1
Fig. 2
Fig. 3
Fig. 4
Inventor
Claude H. Sterling
By Blackmore, Spencer & Hui
Attorneys Patented Sept. 10, 1929.

1,727,794

UNITED STATES PATENT OFFICE.

CLAUDE H. STERLING, OF DETROIT, MICHIGAN, ASSIGNOR TO GENERAL MOTORS CORPORATION, OF DETROIT, MICHIGAN, A CORPORATION OF DELAWARE.

OVERGEAR TRANSMISSION.

Application filed January 15, 1927. Serial No. 161,355.

The subject matter of this invention is a transmission device which has been designed primarily for use on motor vehicles.

Prior to this invention it has been proposed to depart from the more common three-speed and reverse gearing by adding a fourth speed. It has been proposed to utilize external-internal gear trains associated with an eccentrically-mounted gear cage to thereby get a quiet drive for third and fourth speeds. The present invention is of this type. While gearing of this kind may be arranged to employ the direct drive for third speed I prefer, in connection with the present arrangement, to utilize a direct clutch connection between the aligned driving and driven shafts for the fourth and highest speed, and for the third speed to employ the known quiet external-internal gear train.

The more especial object of the present invention is the provision of a convenient arrangement for making the shift between third and fourth speeds. Other objects and advantages will appear as description proceeds.

In the drawing accompanying this description

Figure 1 is a longitudinal vertical section through one form in which my invention may be embodied.

Figure 2 is a similar view of a second form of the invention.

Figure 3 is a section on the line 3—3 of Figure 1.

Figure 4 is a section on the line 4—4 of Figure 2.

In Figures 1 and 2 numeral 5 represents a transmission housing having a front wall 7 and a rear wall 9. Bearing 11 journals a clutch shaft 13 having within the housing an open end. Elongated teeth 15 are formed on shaft 13 and at the extreme inner end the shaft has clutch teeth 17.

The forward end of the aligned driven shaft 19 is piloted within the open end of shaft 13. Ball bearings 21 in the rear wall 9 provide anti-friction support for the driven shaft.

Countershaft 23 is rotatably mounted about a shaft 25 carried by the front and rear walls of the housing. The shaft 23 has a driven gear 27 meshing with the front end of teeth 15. Shaft 23 is formed with spline 29 at its mid-portion for slidably carrying a gear 31, and gears 33 and 35 are fixedly carried by the countershaft 23.

Bearings 37 and 39 rotatably support a ring gear 41 in the housing. This ring gear is eccentrically positioned around aligned shafts 13 and 19. the ring gear 41 is also positioned so as to lie between portions of gears 27 and 31. The ring gear has at one end internal teeth 43 engaging the innermost portion of teeth 15 whereby said ring gear is constantly rotated by the driving shaft but at a lower speed. A second internal gear 45 on gear ring 41 is provided to drive a gear 47 slidably splined to driven shaft 19. It will be observed that the gear train 45 and 47 lies between the bearings 37 and 39 which therefore provide adequate support. This, together with position of gear 43 relative to the bearings, avoids any over-hanging gearing. There is introduced however, the problem of providing suitable operating means for the sliding gear 47. For the solution of this problem the arrangement described below has been designed.

Slidable on the driven shaft is a gear 49 which meshes with gear 33 for low speed and with a gear, not shown, driven by gear 35 for reverse driving.

Also slidable on the driven shaft is a gear 51 for engagement at times with gear 31 when the latter is moved from its illustrated position rearwardly. This gear engagement is to afford second speed. Gear 51 has a hub portion 53 and a collar 55. A plurality of operating pins or links 59 are slidably arranged in grooves of the driven shaft. The rear ends of these pins or links are turned outwardly and held within the hub 53 as shown by Figure 1. Gear 47 which also slides on the driven shaft has a rearward hub portion into which projects the outwardly directed front ends of links 59. The front end of gear 47 is formed with internal teeth 48 arranged to co-operate with teeth 17 to secure a direct clutch connection between the shafts 13 and 19.

The operation of the transmission may be briefly described. With the parts in the position shown collar 55 may be moved forwardly. Through the instrumentality of links 59 a clutch connection between the shafts 13 and 19 is accomplished through teeth 17 and 48. A first step-down drive is had by moving collar 55 rearwardly from the neutral position shown in Figure 1 to affect the engagement of teeth 45 and 47. With this position of parts the driven shaft 19 is driven from the driving shaft 13 through two external-internal gear trains, the ratios of the teeth in these gear trains being such as to drive the driven shaft at a speed below that of the driving shaft. Gears 49, 33, 35 and the reverse idler afford the driving ratios for low and reverse. The drive in second gear 51 assumes the position shown in Figure 1 and gear 31 is moved along the spline portion 29 into engagement with gear 51.

In Figure 2 a very similar arrangement has been shown, and the corresponding parts have been designated by the same reference characters. Differing from the form shown in Figure 1 the inner end of the driving shaft is provided with internal teeth 61 as is also the inner surface of gear 47', which is rotatably mounted upon but not keyed to the driven shaft. In place of the links 59 of the form already described I make use of the Campbell transmission device. The hub of the driven second speed gear 51 rotatably supports the rear ends of rods 63. These rods occupy grooves in the driven shaft. The spline shaft at two positions is formed with enlarged recesses 65, one opposite the internal teeth of the driving shaft and the other at a point opposite the internal teeth of gear 47'. Within these enlarged recesses the rods 63 carry rolling keys 67. Reciprocation of gear 51 operates by an internal cam action on the ends of rods 63, in a manner known to this type of transmission and not herein shown, to rotate said rods 63 and to turn the rolling keys 67. Such reciprocation of gear 51 is prevented from reciprocating rods 63 by the engagement of the rolling keys 67 within the enlarged recesses. In one position of adjustment of gear 53 the rolling key for locking the driven shaft to the driving shaft is rotated into operative position, and in a second position of adjustment of gear 51 the rolling key for locking the driven shaft to the gear 47' is turned into locking position. It is thus readily seen that a reciprocation of gear 51 will so position the rolling keys either to effect a direct clutch connection for high speed or to lock gear 47' to the driven shaft whereupon the driven shaft is driven from the driving shaft at a somewhat reduced speed.

In each of these forms in which the invention is shown the means for reciprocating the links 59 or for rotating the rods 63 is carried by the second speed gear. The second speed gear has three positions, a forward position for direct drive, a rearward position for third speed, and an intermediate position in which it may be engaged by sliding gear 31 of the countershaft. By associating the collar for operating the parts which give direct and third speeds with the gear 51 I am enabled to reduce the dimensions of the transmission housing as a whole.

I claim:

1. In a transmission, aligned driving and driven shafts, a gear ring eccentrically surrounding said shafts, gear elements between said shafts comprising two external-internal gear trains, one gear of each train being carried by said gear ring, the final driven gear of the second train being positioned on said driven shaft within said ring, a gear slidable on the driven shaft outside said gear ring, means operated by a movement of said slidable driven shaft gear to effect a direct clutch connection between the driving and driven shafts in one position of adjustment, and a drive through the gear ring in a second position of adjustment, means to drive said slidable driven shaft gear in a third position of adjustment.

2. The invention defined by claim 1, said last named means comprising a driven countershaft and a gear slidable thereon to engage said driven shaft slidable gear.

3. In a transmission, a housing, aligned driving and driven shafts therein, a gear ring within said housing driven by the driving shaft and eccentrically surrounding said aligned shafts, a gear within said gear ring slidable on said driven shaft to clutch said shafts in one position or to make a connection between said shafts through said ring gear in another position, a collar outside said gear ring spaced from said gear and slidable on said driven shaft, and one or more links connecting said collar and gear, a second slidable gear on said driven shaft, said collar being rigid with the hub of said second slidable gear, and means whereby said driven shaft is driven through said second slidable gear.

4. In a transmission, a gear housing, aligned driving and driven shafts entering said housing, an internal gear ring eccentrically surrounding said shafts within said housing, gearing whereby said gear ring is driven by said driving shaft, a clutch-gear element slidable but non-rotatable on said driven shaft and positioned within said gear ring, means within said housing, slidable on said driven shaft, located outside said gear ring, a connection between said means and said clutch-gear element whereby a first position of said means effects a direct clutch connection between the driving and driven shafts and a second position of said means effects a drive of said driven shaft through the ring gear and the gear part of the clutch-gear element, a gear element rigid with said means, a countershaft cooperating gearing elements on the countershaft and driving shaft, a gear on said countershaft, means for meshing said countershaft gear with the gear element associated with said means whereby said driven shaft is driven at a predetermined ratio.

5. A transmission mechanism comprising aligned driving and driven shafts and a parallel countershaft, gearing between the driving shaft and the countershaft, a gear ring having internal teeth, said ring eccentrically surrounding said aligned shafts, a spur pinion on the driving shaft engaging said internal teeth, a second internal gear on the eccentric gear ring, a combined clutch gear element slidable on the driven shaft within the eccentric gear ring to make clutch engagement with the clutch element of the driving shaft in a position of sliding adjustment and gear connection with the second internal gear of the gear ring in a second position of sliding adjustment, a sliding gear on the driven shaft outside the gear ring, means to slide said last mentioned sliding gear, connecting means between said sliding gear and the clutch gear element, and a gear on the countershaft movable to engage said slidable driven shaft gear in one position of adjustment of the latter.

In testimony whereof I affix my signature.

CLAUDE H. STERLING.